United States Patent
Oyoshi (10) Patent No.: US 9,880,763 B2
(45) Date of Patent: Jan. 30, 2018

(54) DATA PROCESSING APPARATUS AND DATA PROCESSING METHOD FOR PROCESSING DATA IN MEMORY

(71) Applicant: CANON KABUSHIKI KAISHA, Tokyo (JP)

(72) Inventor: Kazuhiro Oyoshi, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 23 days.

(21) Appl. No.: 15/044,854

(22) Filed: Feb. 16, 2016

(65) Prior Publication Data

US 2016/0246524 A1    Aug. 25, 2016

(30) Foreign Application Priority Data

Feb. 24, 2015    (JP) .................................. 2015-034015

(51) Int. Cl.
*G06F 12/00* (2006.01)
*G06F 13/00* (2006.01)
(Continued)

(52) U.S. Cl.
CPC .......... *G06F 3/0619* (2013.01); *G06F 3/0605* (2013.01); *G06F 3/0652* (2013.01);
(Continued)

(58) Field of Classification Search
CPC ........ G06F 3/06; G06F 3/0601; G06F 3/0602; G06F 3/0605; G06F 3/0614; G06F 3/0616; G06F 3/0619; G06F 3/062; G06F 3/0622; G06F 3/0623; G06F 3/0628; G06F 3/064; G06F 3/0643; G06F 3/0646; G06F 3/0652; G06F 12/0223; G06F 12/023; G06F 12/0238; G06F 12/0246; G06F 12/0804; G06F 12/0866; G06F 17/30067; G06F 11/00; G06F 11/1008; G06F 11/14;
(Continued)

(56) References Cited

U.S. PATENT DOCUMENTS

| 5,963,474 A | * | 10/1999 | Uno | ....................... | G06F 3/0614 |
| | | | | | 365/185.04 |
| 7,047,354 B2 | * | 5/2006 | Yagisawa | .............. | G06F 3/0607 |
| | | | | | 711/112 |

(Continued)

FOREIGN PATENT DOCUMENTS

JP    2014-167809 A    9/2014

OTHER PUBLICATIONS

SoK: Secure Data Deletion; Reardon et al; 2013 IEEE Symposium on Security and Privacy; May 19-22, 2013; pp. 301-315 (15 pages).*

(Continued)

*Primary Examiner* — Daniel C Chappell
(74) *Attorney, Agent, or Firm* — Fitzpatrick, Cella, Harper & Scinto (57) ABSTRACT

In a case where a non-volatile memory comes close to the end of a life time and has become ReadOnly, it is impossible to erase data stored in the non-volatile memory, which may lead to a decreased robustness of maintaining confidentiality. A data processing apparatus determines whether the life time of a non-volatile memory is about to expire. In a case where the determination result indicates that the life time of the non-volatile memory is about to expire, the data stored in the non-volatile memory is erased.

9 Claims, 6 Drawing Sheets

(51) Int. Cl.
*G06F 13/28* (2006.01)
*G06F 3/06* (2006.01)
*G06F 11/34* (2006.01)

(52) U.S. Cl.
CPC ............ *G06F 3/0679* (2013.01); *G06F 11/34* (2013.01); *G06F 3/0653* (2013.01)

(58) Field of Classification Search
CPC .. G06F 11/1446; G06F 11/20; G06F 11/2056; G06F 11/34; G06F 11/3409; G06F 11/3419; G06F 11/3433; G06F 2003/0691; G06F 2003/0692; G06F 2003/0694; G06F 2003/0695; G06F 2003/0697; G06F 2003/0698; G06F 21/78; G06F 21/79; G06F 21/80; G06F 2212/72–2212/7211; G06F 2221/2143
See application file for complete search history.

(56) References Cited

U.S. PATENT DOCUMENTS

| | | | | |
|---|---|---|---|---|
| 7,903,486 B2* | 3/2011 | Danilak | ............... | G11C 16/349 365/185.11 |
| 7,904,619 B2* | 3/2011 | Danilak | ............... | G06F 12/0246 710/52 |
| 8,725,938 B2* | 5/2014 | Flynn | ............... | G06F 12/0246 711/103 |
| 8,812,744 B1* | 8/2014 | Lyigun | ............... | G06F 3/0608 710/15 |
| 8,943,266 B2* | 1/2015 | Koseki | ............... | G06F 11/108 711/103 |
| 9,042,181 B2* | 5/2015 | Flynn | ............... | G11C 16/14 365/185.18 |
| 9,569,120 B2* | 2/2017 | Ryan | ............... | G11C 16/349 |
| 9,632,712 B2* | 4/2017 | Shen | ............... | G06F 3/0619 |
| 9,645,750 B2* | 5/2017 | Danilak | ............... | G06F 3/0616 |
| 9,696,916 B2* | 7/2017 | Danilak | ............... | G06F 3/0616 |
| 9,727,263 B2* | 8/2017 | Bennett | ............... | G06F 3/0619 |
| 2003/0002366 A1* | 1/2003 | Mizoguchi | ............... | G06F 3/0619 365/201 |
| 2003/0135793 A1* | 7/2003 | Craig | ............... | G11C 16/349 714/42 |
| 2007/0263444 A1* | 11/2007 | Gorobets | ............... | G11C 8/10 365/185.09 |
| 2008/0046649 A1* | 2/2008 | Ito | ............... | G11C 16/349 711/115 |
| 2008/0082725 A1* | 4/2008 | Elhamias | ............... | G06F 12/0246 711/103 |
| 2010/0049905 A1* | 2/2010 | Ouchi | ............... | G06F 1/3225 711/103 |
| 2010/0122019 A1* | 5/2010 | Flynn | ............... | G06F 12/0246 711/103 |
| 2014/0269090 A1* | 9/2014 | Flynn | ............... | G11C 16/14 365/185.19 |
| 2015/0082125 A1* | 3/2015 | Miura | ............... | G06F 12/0246 714/773 |

OTHER PUBLICATIONS

Introduction to Nonvolatile Memory; Brewer et al; ISBN 9780470181355; 2008; pp. 1-18 (18 pages).*
A Reliability Enhancement Mechanism for High-Assurance MLC Flash-Based Storage Systems; Mir et al; IEEE 17th International Conference on Embedded and Real-Time Computing Systems and Applications; Aug. 28-31, 2011; pp. 190-194 (5 pages).*
eNVy: a non-volatile, main memory storage system; Wu et al; Proceedings of the sixth international conference on Architectural support for programming languages and operating systems; Oct. 5-7, 1994; pp. 86-97 (12 pages).*

* cited by examiner

FIG.4C
411
DATA BACKUP AND COLLECTIVE ERASING ONGOING
(DO NOT POWER OFF)

FIG.4D
412
DATA BACKUP AND COLLECTIVE ERASING COMPLETED
413
OK

FIG.4A
408
SERVICE ERROR
(PLEASE CONTACT YOUR RETAILER)

FIG.4B
409
SERVICE ERROR
(COLLECTIVE ERASING WILL BE PERFORMED AFTER BACKUP OF DATA IN STORAGE. PLEASE SET USB MEMORY.)
410
OK

DATA PROCESSING APPARATUS AND DATA PROCESSING METHOD FOR PROCESSING DATA IN MEMORY

BACKGROUND OF THE INVENTION

Field of the Invention

The present invention relates to a data processing apparatus and a data processing method for processing data in a memory.

Description of the Related Art

There is known a technique with regard to memory control, which prevents destruction of data stored in a non-volatile memory by controlling so as to inhibit write operation to the non-volatile memory, in a case where the life time of the non-volatile memory is about to expire (Japanese Patent Laid-Open No. 2014-167809).

Japanese Patent Laid-Open No. 2014-167809 discloses a technique which focuses on protecting data stored in a non-volatile memory from destruction. However, in a case where highly confidential data is stored in the non-volatile memory, there may be a situation in which it is desirable to erase, rather than protect, the data in terms of security assurance. With the life time of the non-volatile memory being about to expire, there may be a case where writing of data is impossible and only reading of data is possible. In a case where only reading of data is possible, erasing the data stored in the non-volatile memory becomes impossible.

SUMMARY OF THE INVENTION

A data processing apparatus according to the present invention is a data processing apparatus storing data in a non-volatile memory and has a determination unit configured to determine whether a life time of the non-volatile memory is about to expire, and an erasing unit configured to erase data stored in the non-volatile memory in a case where it is determined by the determination unit that the life time of the non-volatile memory is about to expire.

Further features of the present invention will become apparent from the following description of exemplary embodiments (with reference to the attached drawings).

DESCRIPTION OF THE EMBODIMENTS

In the following, embodiments of the present invention will be described, referring to the drawings.

Embodiment 1

Figure 1:
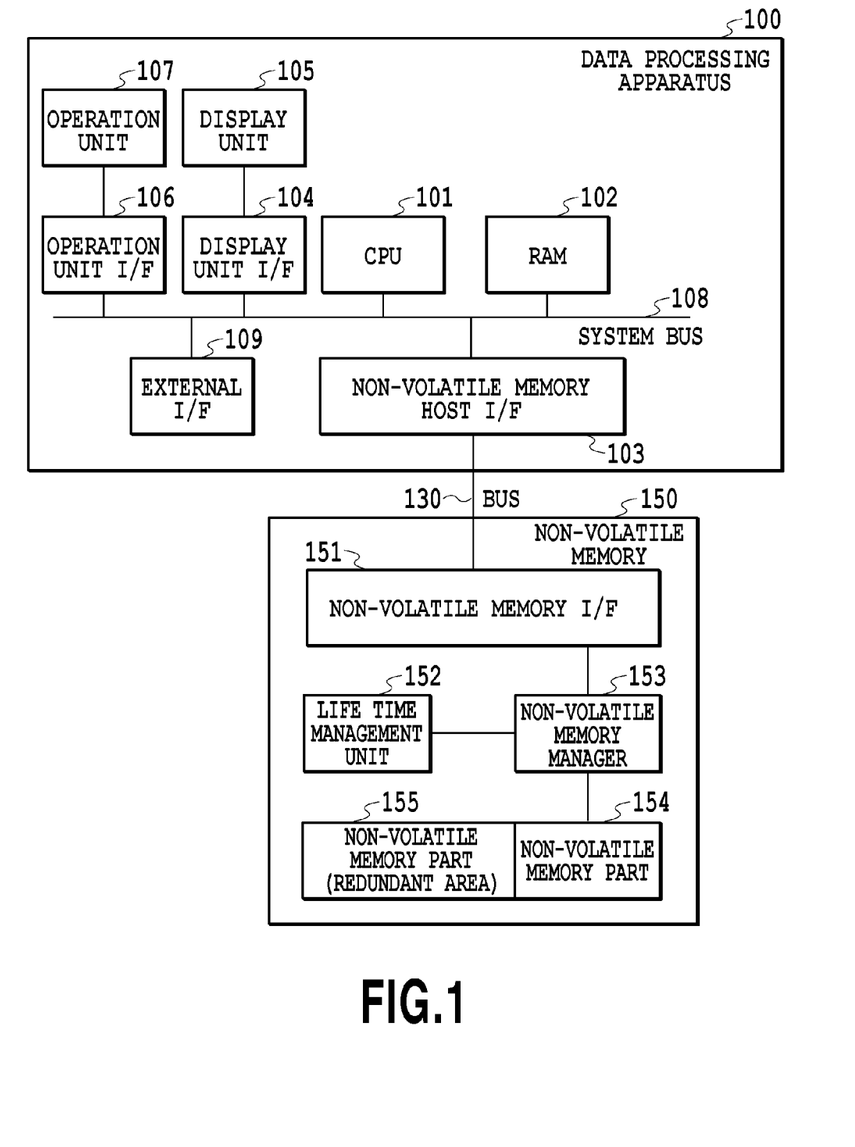
FIG. 1 illustrates a hardware configuration including a data processing apparatus according to an embodiment.

FIG. 1 illustrates an exemplary hardware configuration including a data processing apparatus 100 according to the present embodiment. In FIG. 1, the data processing apparatus 100 has a CPU 101, a RAM 102, a non-volatile memory host I/F 103, a display unit I/F 104, a display unit 105, an operation unit I/F 106, and an operation unit 107.

The data processing apparatus 100 is connected to the non-volatile memory 150 via a bus 130. Although the data processing apparatus 100 and the non-volatile memory 150 are described as separate components in the example in FIG. 1 for illustrative purposes, it goes without saying that the data processing apparatus 100 may be configured so as to include the non-volatile memory 150.

The CPU 101 of the data processing apparatus 100 that processes data in a non-volatile memory is a controller configured to control the entire data processing apparatus 100, and also performs various arithmetic operations. The RAM 102 is a system work memory used by the CPU 101 to operate, and provides an area for loading data and programs from the non-volatile memory 150. The CPU 101 performs arithmetic operations and various controls using the data and programs loaded to the RAM 102. The non-volatile memory host I/F 103 is an interface controlled by the CPU 101 to input and output data from and to the non-volatile memory 150.

The display unit I/F 104 is an interface controlled by the CPU 101 to transmit display signals to the display unit 105. The display unit 105 includes a liquid crystal panel, LEDs, or the like, and transmits information to the user by displaying a screen on the liquid crystal panel, or turning-on/blinking/turning-off of the LEDs. The operation unit I/F 106, being connected to the operation unit 107, is an interface for transmitting electric signals from the operation unit 107 to the CPU 101. The operation unit 107 includes a touch panel, keys, or the like, and transmits information provided by user operation to the CPU 101. An external I/F 109 is configured to allow data input and output from and to the outside via an interface such as USB. Such modules, which are connected to the CPU 101 via a system bus 108, are controlled by the CPU 101 to operate in conjunction with each other.

The non-volatile memory 150 has a non-volatile memory I/F 151, a life time management unit 152, a non-volatile memory manager 153, a non-volatile memory part 154, and a redundant area 155. Although a component conforming to the eMMC (Embedded Multi Media Card) standard is described as an exemplary non-volatile memory in the present embodiment, the invention is not limited thereto.

The non-volatile memory I/F 151 is an interface for performing data input and output from and to the data processing apparatus 100. The life time management unit 152 is a module configured to manage the life time of the non-volatile memory 150.

The non-volatile memory manager 153, which is connected to the non-volatile memory part 154, the redundant area 155, and the life time management unit 152, interprets various commands received from the data processing apparatus 100 via the non-volatile memory I/F 151, and performs operations according to the commands. There are read, write, and erase commands as basic commands, which allow reading, writing, and erasing data in a predetermined address. In addition, upon receiving a life time check command from the data processing apparatus, the non-volatile memory manager 153 refers to the life time of the non-volatile memory 150 being managed by the life time management unit 152, and returns the state of a cell of the non-volatile memory 150 at the time to the data processing apparatus 100 as a response.

The non-volatile memory part 154, which is a non-volatile memory area for storing data, includes a plurality of cells. Storing, reading, writing, or erasing of data will be performed, under control of the non-volatile memory manager 153, according to whether or not electric charge is held in a cell in the non-volatile memory part 154.

As a cell in the non-volatile memory part 154 degrades over repeated reading, writing, or erasing of data, a cell whose life time has expired is made unusable as a defective cell and replaced by a cell in the redundant area 155 for subsequent use. The number of rewriting times and the number of reserved blocks are used as information indicating the degree of degradation of such a cell. The number of rewriting times of the cell and the number of reserved blocks are managed by the life time management unit 152 as the cell state. The life time management unit 152 manages the upper limit of the number of rewritable times, at which the life time of each cell in the non-volatile memory part 154 (including the redundant area 155) is assumed to have expired. For example, a value such as 100,000 times is managed as the upper limit of the number of rewritable times. On the other hand, the life time management unit 152 manages the number of times rewriting has been actually performed, and therefore can return, as a response to a life time check command, a value indicating the consumption rate of the number of rewritable times in increments of 10%, for example. In addition, the life time management unit 152 also manages the number of reserved blocks, separately from the aforementioned number of rewriting times. As has been described above, a cell whose life time has expired is made unusable as a defective cell and replaced by a cell in the redundant area 155 for subsequent use, and therefore a reduced number of reserved blocks (i.e., an increased number of reserved blocks being used) indicates that the life time is about to expire. As thus described, the life time of the non-volatile memory part 154 (including the redundant area 155) can be determined from the number of cell rewriting times or the number of reserved blocks. The number of cell rewriting times and the number of reserved blocks are managed in different dimensions. According to the present embodiment, therefore, it is possible to determine that the life time of the non-volatile memory 150 is about to expire in a case where either the number of cell rewriting times or the number of reserved blocks comes close to the upper limit.

Upon receiving a life time check command from the data processing apparatus 100, the non-volatile memory manager 153 returns, as a response to the data processing apparatus 100, a value according to the number of each cell rewriting times or a value according to the number of reserved blocks in the redundant area 155 as information indicating the cell state. The value according to the number of each cell rewriting times on this occasion or the value according to the number of reserved blocks in the redundant area 155 are obtained by the non-volatile memory manager as a response to transmission of a predetermined command to the life time management unit 152 by the non-volatile memory manager 153.

Among the pieces of information indicating the cell state, a value indicating, in increments of 10%, the consumption rate relative to the upper limit of number of rewritable times, which is assumed to be point of life time expiration, is used as the value according to the number of each cell rewriting times, as has been described above. In a case where 80% of the reserved blocks have been used for the substitute, the life time management unit 152 sets up a flag as a Warning and therefore this value can be used as the value according to the number of reserved blocks in the redundant area 155. Here, the life time management unit 152 subsequently keeps using the non-volatile memory part and, upon using up 100% of the reserved blocks for the substitute, sets up an Urgent flag. Upon setting up of the Urgent flag, the non-volatile memory 150 turns into a state in which writing or erasing of data is impossible and only reading is possible.

At the host side (the data processing apparatus 100 side), it is possible to know that the remaining life time of the non-volatile memory 150 is short by checking the values of the response to the life time check commands.

Figure 2:
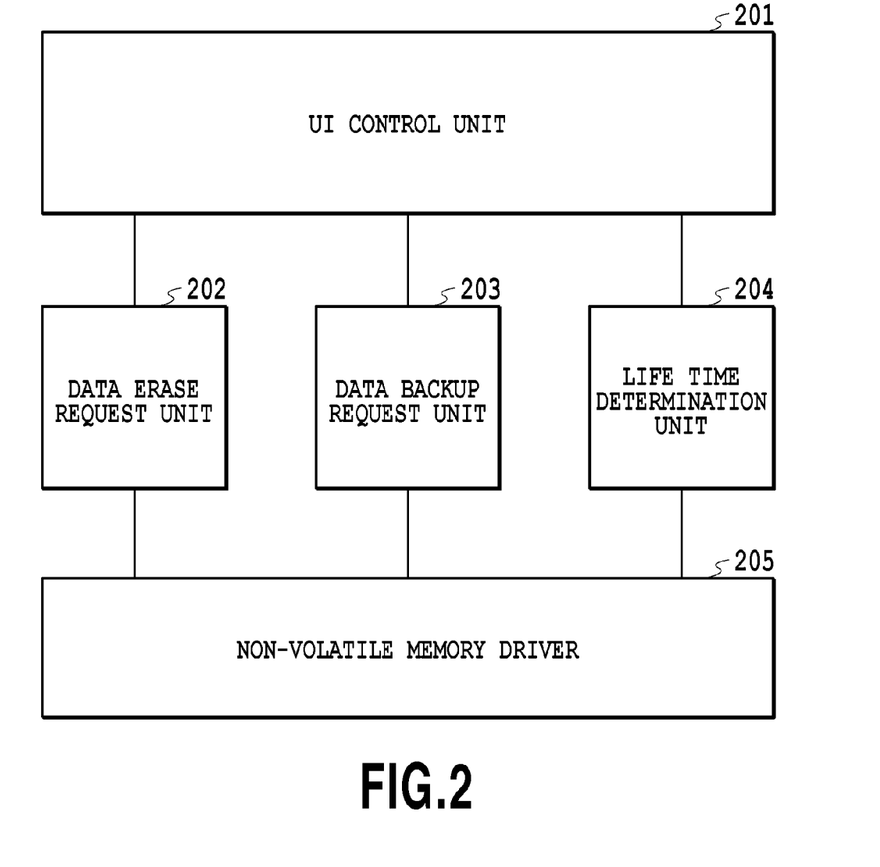
FIG. 2 illustrates a software configuration of a data processing apparatus according to an embodiment.

FIG. 2 illustrates a software configuration of the data processing apparatus 100 according to the present embodiment. The data processing apparatus 100 has a UI control unit 201, a data erase request unit 202, a data backup request unit 203, a lifetime determination unit 204, and a non-volatile memory driver 205.

The UI control unit 201 is a control program controlled by the CPU 101 to notify the user of information by controlling the display unit I/F 104 to display information on the display unit 105. In addition, the UI control unit 201 accepts user operations from the operation unit 107 at the operation unit I/F 106 and, according to the accepted operation, notifies the data erase request unit 202 and the data backup request unit 203 of the start of processing.

Upon receiving the notification from the UI control unit 201, the data erase request unit 202 notifies the non-volatile memory driver 205 of the data erase request. Upon receiving the data erase request, the non-volatile memory driver 205 controls the non-volatile memory host I/F 103 to issue an erase command to the non-volatile memory 150 via the bus 130. Accordingly, the data stored in the non-volatile memory 150 is erased.

In addition, upon receiving the notification from the UI control unit 201, the data backup request unit 203 notifies the non-volatile memory driver 205 of a data read request. Upon receiving the data read request, the non-volatile memory driver 205 controls the non-volatile memory host I/F 103 to issue a read command to the non-volatile memory 150 via the bus 130. The read-in data is transmitted to the data processing apparatus 100 via the bus 130, and controlled so as to be written to a storage such as a USB memory connected to an external I/F 109 via the system bus 108. Accordingly, the data stored in the non-volatile memory 150 is erased, and backed-up by a storage such as a USB memory.

The life time determination unit 204 notifies the non-volatile memory driver 205 of a lifetime check command and, according to the response value thereof, the CPU 101 controls the UI control unit 201 and the non-volatile memory driver 205. For example, in a case where the response value of the life time check command is a value (=80% to 90%) according to the number of each cell rewriting times, the life time determination unit 204 notifies the UI control unit 201 to display an alarm that the life time of the non-volatile memory is about to expire. Alternatively, in a case where a Warning flag has been set up because the response value of the life time check command indicates that 80% of the reserved blocks have been used for the substitute, the life time determination unit 204 notifies the UI control unit 201 to display an alarm that the life time of the non-volatile memory is about to expire.

On this occasion, in addition to displaying an alarm that the life time of the non-volatile memory is about to expire, the life time determination unit 204 may be operated to prompt erasing of the data, execute erasing of the data after backup, or automatically erase the data. In other words, the life time determination unit 204 may inform the non-volatile memory driver 205 to erase the data without prompting the user to erase the data according to the response value. Alternatively, in a case where it is determined by the life time determination unit 204 that the life time is about to expire, the CPU 101 may temporarily terminate the operation of the data processing apparatus 100 due to occurrence of an error therein. In such a case, the CPU 101 may control the UI control unit 201 to display the occurrence of an error on the display unit 105, and also reject operation by the operation unit 107. Subsequently, after removal of the error, the CPU 101 may execute erasing of data in the non-volatile memory 150, or erasing after data backup.

In addition, a value (=90% to 100%) according to the number of each cell rewriting times may be used as a threshold value, as a criterion of the life time determination, or the manner of setting off an alarm may be changed according to the values in increments of 10%. In addition, with regard to data erasing, areas may be made selectable and may be partially erased according to the user's selection instead of collectively erasing all areas.

Figure 3A:
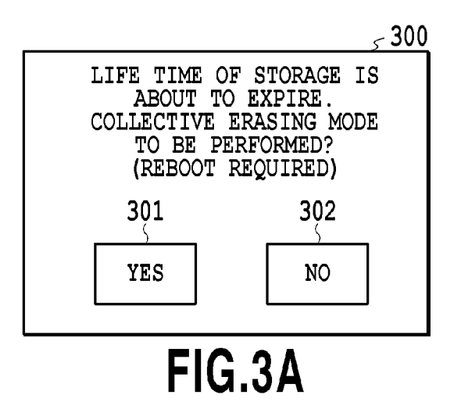
FIGS. 3A to 3D illustrate an exemplary alarm screen according to an embodiment.

FIGS. 3A to 3D illustrate examples of an alarm display screen for a case where the life time of the non-volatile memory 150 according to the present embodiment is about to expire, or a display screen at the time of collectively erasing data in the non-volatile memory 150. An alarm screen 300 illustrated in FIG. 3A is an exemplary alarm display screen to be displayed on the display unit 105 for a case where the life time of the non-volatile memory 150 is about to expire. The alarm screen 300, with the life time of the storage being about to expire, displays a screen prompting the user to select whether or not to execute a collective erasing mode. On this occasion, the user's pressing a "YES" button 301 causes the data processing apparatus 100 to activate the collective data erasing mode. In other words, the UI control unit 201 notifies the data erase request unit 202 of the activation of the collective data erasing mode, and the data erase request unit 202 notifies the non-volatile memory driver 205 of a data erase request. Upon receiving the data erase request, the non-volatile memory driver 205 controls the non-volatile memory host I/F 103 to issue an erase command to the non-volatile memory 150, whereby the data in the non-volatile memory 150 are collectively erased.

Figure 3B:
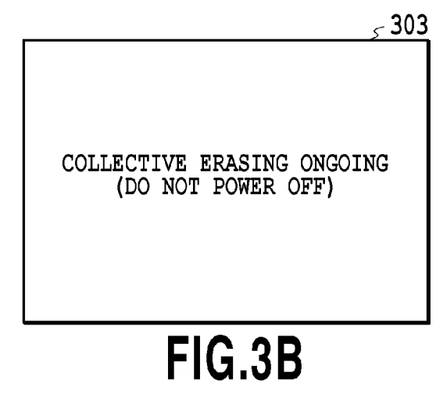
Figure 3C:
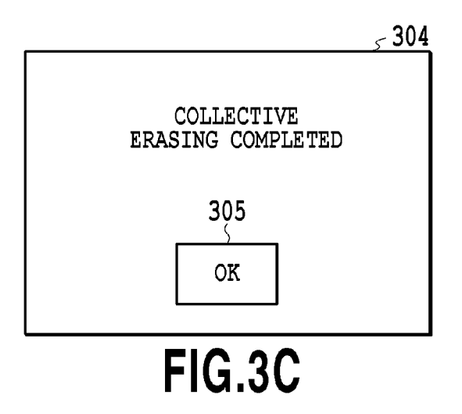

A collective-erasing-ongoing screen 303 illustrated in FIG. 3B presents an exemplary screen displayed on the display unit 105 during collective data erasing. A collective-erasing-completed screen 304 illustrated in FIG. 3C presents an exemplary screen to be displayed on the display unit 105 upon completion of the collective data erasing. The user's pressing an "OK" button 305 while the collective-erasing-completed screen 304 illustrated in FIG. 3C is being displayed terminates the collective data erasing mode.

Figure 3D:
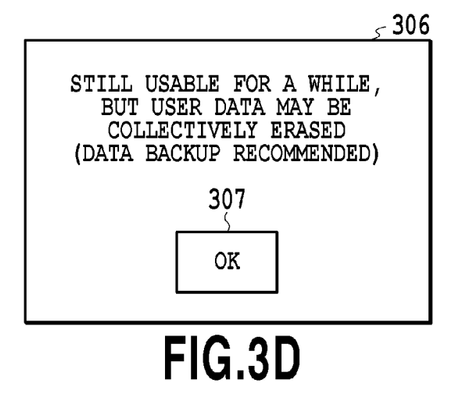

Next, an exemplary case where the user presses a "NO" button 302 while the alarm screen 300 in FIG. 3A is being displayed will be described. A alarm screen 306 in FIG. 3D is an exemplary alarm display screen displayed upon the user's pressing the "NO" button 302 while the alarm screen 300 in FIG. 3A is being displayed. The alarm screen 306 in FIG. 3D is displayed on the display unit 105. The alarm screen 306 in FIG. 3D is an exemplary screen alerting the user that the storage is still usable for a while, but collective erasing of user data may be performed. The user's pressing an "OK" button 307 while the alarm screen 306 in FIG. 3D is being displayed terminates the display of the alarm screen 306.

Figure 4A:
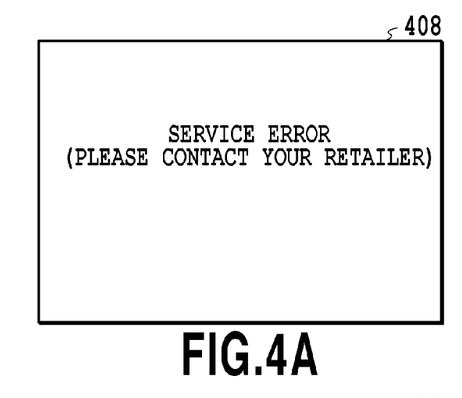
FIGS. 4A to 4D illustrate an exemplary alarm screen according to an embodiment.

Next, another exemplary alarm display screen for a case where the life time is about to expire will be described, referring to FIGS. 4A to 4D. An alarm screen 408 in FIG. 4A is another exemplary alarm display screen to be displayed on the display unit 105 for a case where the life time of the non-volatile memory 150 is about to expire. Upon receiving a determination result from the life time determination unit 204, the UI control unit 201 displays the alarm screen 408 indicating that a service error has occurred on the display unit 105. In addition, the UI control unit 201 temporarily terminates the operation of the data processing apparatus 100, because of occurrence of an error.

Figure 4B:
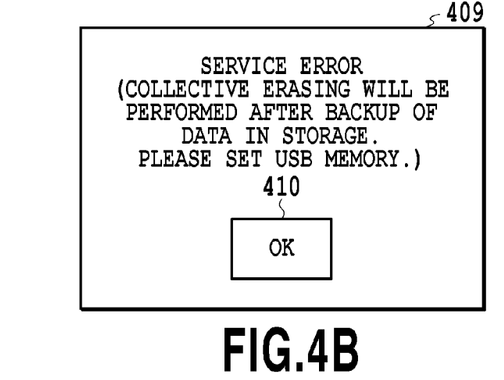
Figure 4C:
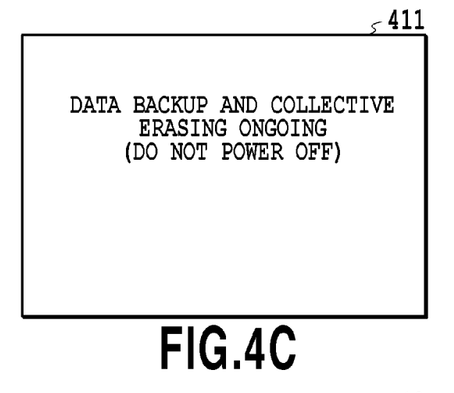
Figure 4D:
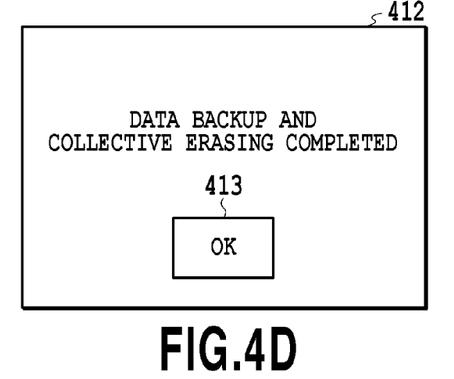

An alarm screen 409 illustrated in FIG. 4B is a yet another exemplary alarm display screen to be displayed on the display unit 105 for a case where the life time of the non-volatile memory 150 is about to expire. Upon receiving the determination result from the life time determination unit 204, the UI control unit 201 displays, on the display unit 105, the alarm screen 409 indicating that a service error has occurred. The alarm screen 409 notifies the user of collective erasing of the data in the storage after backup, and prompts the user to set a USB memory for the backup. On this occasion, the UI control unit 201 temporarily terminates the operation of the data processing apparatus 100, because of occurrence of an error. Subsequently, in response to the user's pressing an "OK" button 410 after having connected the USB memory to the external I/F 109 of the data processing apparatus 100, the UI control unit 201 activates the data backup and collective erasing mode. The UI control unit 201 notifies the data backup request unit 203 of a data backup request. The data backup request unit 203 receives the notification from the UI control unit 201 and notifies the non-volatile memory driver 205 of the data read request. Upon receiving the data read request, the non-volatile memory driver 205 controls the non-volatile memory host I/F 103 to issue a read command to the non-volatile memory 150 via the bus 130. In response to the read command, the CPU 101 of the data processing apparatus executes a process of writing, to the USB memory connected to the external I/F 109, the data which has been read from the non-volatile memory 150. Subsequently, upon completion of writing the data to USB memory, the CPU 101 notifies the non-volatile memory driver 205 of a data erase request. Upon receiving the data erase request, the non-volatile memory driver 205 controls the non-volatile memory host I/F 103 to issue an erase command and collectively erases the data in the non-volatile memory 150. The display screen 411 in FIG. 4C illustrates an exemplary screen displayed on the display unit 105 during data backup and collective data erasing. The data backup and collective-erasing-completed screen 412 illustrated in FIG. 4D is displayed on the display unit 105 upon completion of collective erasing after data backup. The user's pressing an "OK" button 413 while the data backup and collective-erasing-completed screen 412 is being displayed illustrated in FIG. 4D terminates the data backup and collective erasing mode.

Figure 5:
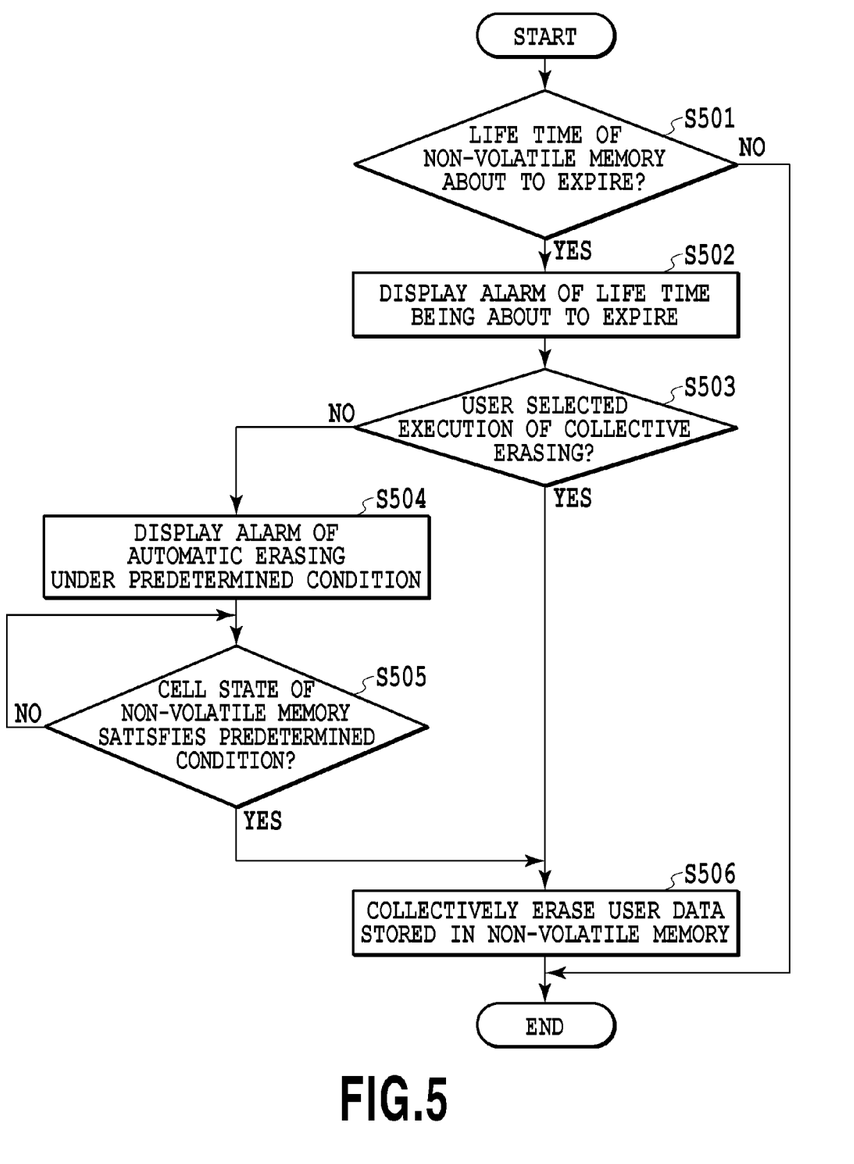
FIG. 5 is a flowchart illustrating an operation flow according to Embodiment 1.

Next, the process flow of the data processing apparatus according to the present embodiment will be described. FIG. 5 is a flow chart illustrating the operation flow according to the present embodiment, which is a flow illustrating the operation of software controlled by the CPU 101 of the processing apparatus 100.

At step S501, the life time determination unit 204 determines whether or not the life time of the non-volatile memory 150 is about to expire. Here, the life time determination unit 204 waits until the life time of the non-volatile memory 150 is about to expire. Determination of whether or not the life time is about to expire is performed according to the response value returned from the non-volatile memory 150 in response to the life time check command issued by the life time determination unit 204 to the non-volatile memory 150 at a predetermined timing. For example, if the response value of the life time check command is a value (=80% to 90%) according to the number of each cell rewriting times, the life time determination unit 204 determines that the life time of the non-volatile memory is about to expire, and the process flow proceeds to step S502.

At step S502, the UI control unit 201 displays the alarm screen 300 indicating that the life time of the non-volatile memory is about to expire.

At step S503, the UI control unit 201 determines whether or not the user has selected execution of collective erasing. For example, the UI control unit 201 determines whether or not the user's pressing the "YES" button 301 presented on the alarm screen 300 has been accepted, or whether or not the user's pressing the "NO" button 302 has been accepted. For a touch panel having the display unit and the operation unit integrated thereon, the aforementioned acceptance may be determined based on whether or not respective buttons have been pressed (touched), or may be determined according to the operation performed on the operation unit if the display unit and the operation unit are separate components. Upon detecting by the UI control unit 201 that the user has pressed the "YES" button 301, the process flow proceeds to step S506, or the process flow proceeds to step S504 upon detecting by the UI control unit 201 that the user has pressed the "NO" button 302. Although an example of switching processes according to the user's operation on the operation unit is described here, there may be provided a predetermined timer, for example. In a case, for example, where the alarm screen 300 is displayed for a certain time and there is no selection operation performed by the user, the process may be configured to proceed to step S504 according to the default setting, or proceed to step S506. In addition, although an example of displaying the alarm screen 300 on the display unit 105 has been described here, there may be warning LEDs separately prepared, which may be turned on or caused to blink, for example. In addition, the visual notification may be replaced by audio notification. In the following, although "display" is taken as an example in the process in FIG. 5, it suffices that information reaches the user and therefore the process may be performed using any type of notification.

If the user has pressed the "NO" button 302, the UI control unit 201 displays, at step S504, the alarm screen 306, for example, illustrated in FIG. 3D on the display unit 105. Although the data processing apparatus 100 remains usable for a while, the user is notified of the possibility that user data may be automatically erased. In other words, the user is notified that the data may be automatically erased upon satisfying a predetermined condition.

Subsequently, at step S505, the life time determination unit 204 determines whether or not the cell state of the non-volatile memory has satisfied the predetermined condition. For example, the life time determination unit 204 determines whether or not the life time of the non-volatile memory is closer to expiration than the cell state determined at step S501. If the life time determination unit 204 has determined that the cell state of the non-volatile memory 150 has satisfied the predetermined condition, the process flow proceeds to step S506. Determination of the cell state is performed according to the response value returned by the life time check command. For example, the life time determination unit 204 determines that the life time has expired if the response value of a life time check command is a value (=90% to 100%) according to the number of each cell rewriting times. Alternatively, the life time determination unit 204 determines that the life time has expired if a Warning flag has been set up indicating that 80% of the reserved blocks have been used for the substitute, according to the response value of the life time check command.

At step S506, the data erase request unit 202 issues a data erase request to collectively erase the user data stored in the non-volatile memory 150. In response thereto, a process of collectively erasing the user data stored is performed by the non-volatile memory manager 153 of the non-volatile memory 150. Although a process of collectively erasing the user data is taken as an example here, a process of backing up and collectively erasing the user data is also conceivable as described above.

In the aforementioned process, an example has been described such that the UI control unit 201 displays an alarm at step S502 if the life time determination unit 204 has determined at step S501 that the life time of the non-volatile memory is about to expire. There has also been described an example such that the user's selection is subsequently accepted at step S503. However, there may be a process which skips the steps S502 and S503. In other words, if the life time determination unit 204 has determined at step S501 that the life time of the non-volatile memory is about to expire, the process flow may proceed to step S506 where the data erase request unit 202 may output an erase request to erase the user data stored in the non-volatile memory. In other words, there may be performed a process which automatically and collectively erases the user data without presenting the alarm display to the user and without accepting the user's selection if the life time of the non-volatile memory is about to expire.

As thus described, controlling the non-volatile memory by the data processing apparatus 100 while checking the cell state of the non-volatile memory 150 makes it possible to avoid a situation in which erasing of the data stored in the non-volatile memory 150 becomes impossible. Accordingly, it is possible to use the data processing apparatus 100 having a non-volatile memory mounted thereon while ensuring user security.

Embodiment 2

Figure 6:
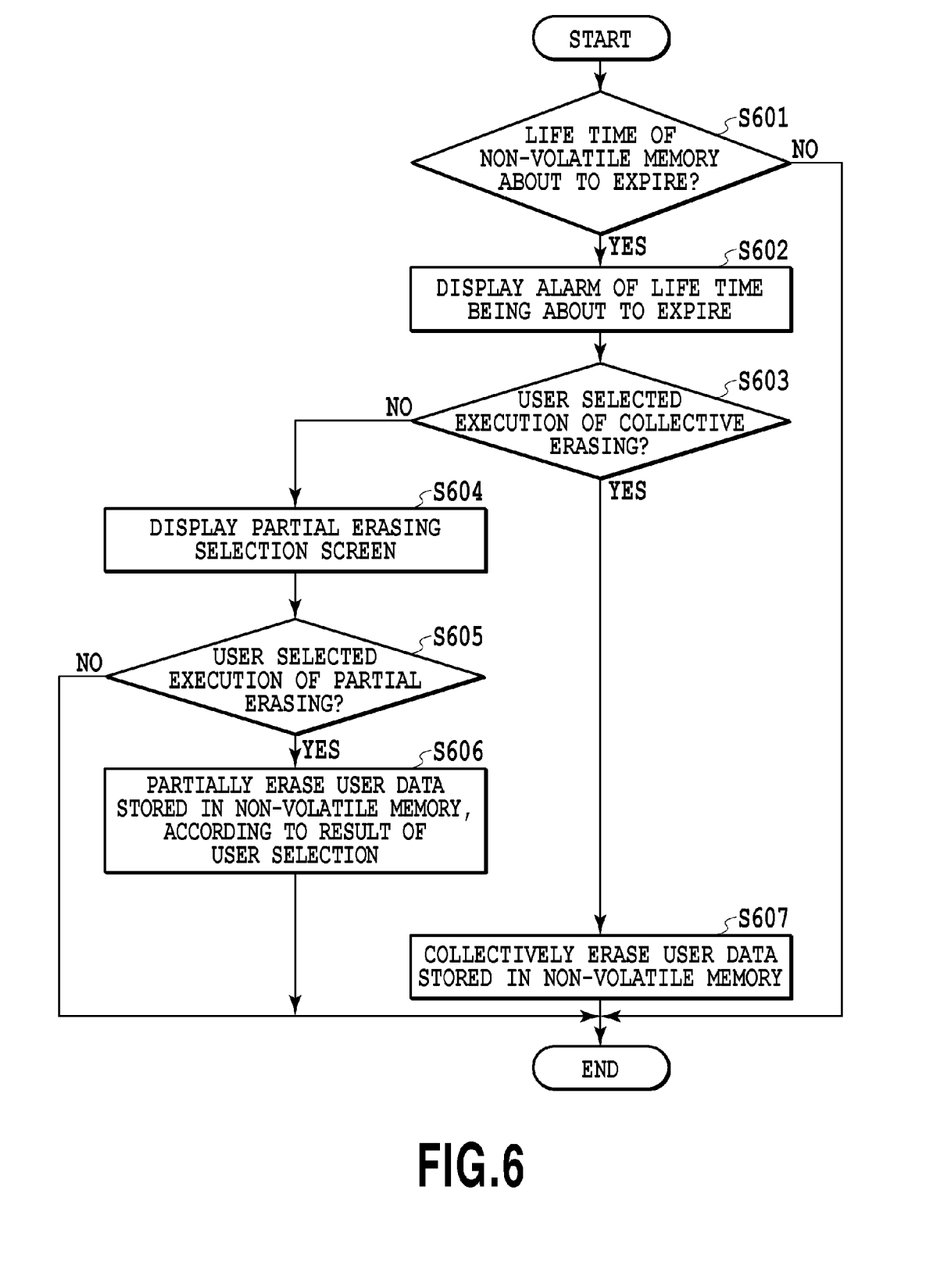
FIG. 6 is a flowchart illustrating an operation flow according to Embodiment 2.

FIG. 6 is a flow chart illustrating the operation flow according to Embodiment 2, which is a flow illustrating the operation of software controlled by the CPU 101 of the data processing apparatus 100 of the non-volatile memory.

Depending on the degree of necessity of security of the data stored in the non-volatile memory 150, there may be a case where security of all the data need not be ensured, with security assurance being desired for only a particular type of data. For example, with regard to the user's way of usage, there may be a case where security assurance is desired for such as address book data including FAX numbers, or document prototype, but various setting values, or the like, for setting operation modes of the data processing apparatus 100 are of less interest. In such a case, the operation as described in the present flow is preferable.

Steps S601 to S603 and S607 in FIG. 6 perform same processes as steps S501 to S503 and S506 in FIG. 5, and therefore explanation thereof is omitted.

At step S604, the UI control unit 201 displays a user data partial erasing selection screen (not illustrated), and prompts, at step S605, the user to select the data to be erased. For example, the user is prompted to select the data to be erased, such as address book data including FAX numbers. In addition, the user may be prompted at step S604 to select erasing of all the data.

At step S606, the data erase request unit 202 issues a data erase request to partially erase the data selected, by the user at step S605, among the user data stored in the non-volatile memory 150.

According to the present embodiment, as has been described above, the data processing apparatus 100 can be used with data of less security interest being left as it is, whereby user convenience is maintained without affecting the ease of use.

As has been described in Embodiment 1, user data may be erased without displaying an alarm screen, in which occasion the process may erase a part of the user data according to a predetermined setting, instead of erasing all the user data. Therefore, according to the present embodiment, the part of the data to be erased may be determined based on preliminarily set information, or may be determined in accordance with the user's selection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it becomes possible to erase data stored in a non-volatile memory before erasing of the data becomes impossible due to expiration of the life time of the non-volatile memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-034015, filed Feb. 24, 2015, which is hereby incorporated by reference wherein in its entirety.

What is claimed is:

1. A data processing apparatus that stores data in a non-volatile memory, comprising:
   a determination unit configured to determine whether a life time of the non-volatile memory is about to expire by referring to a response value of a life time check command issued to a non-volatile memory, wherein the determination unit refers to a first response value indicating a number of rewriting times of a cell in the non-volatile memory and a second response value indicating a number of reserved blocks in the non-volatile memory, and, in a case where one of the response values indicates a corresponding predetermined value of the one of the values, determines that the life time of the non-volatile memory is about to expire;
   an accepting unit configured to accept a selection of whether or not to erase data stored in the non-volatile memory in a case where the determination unit determines that the life time of the non-volatile memory is about to expire;
   an erasing unit configured to erase the data stored in the non-volatile memory, in a case where the accepting unit has accepted the selection of erasing the data stored in the non-volatile memory; and
   a display unit configured to display whether or not to erase the data stored in the non-volatile memory, in a case where the determination unit has determined that the first response value indicates a first value which is a predetermined value corresponding to the first response value, wherein
   the accepting unit accepts a selection from a user after the display has been performed by the display unit, and
   the determination unit further performs a determination after the accepting unit has accepted a selection of not erasing the data stored in the non-volatile memory, and determines whether the first response value indicates a second value indicating that the number of rewriting times of a cell is larger than the first value, or the second response value indicates a predetermined value corresponding to the second response value, and
   the erasing unit erases the data stored in the non-volatile memory in a case where the determination unit has determined that the first response value indicates a second value indicating that the number of rewriting times of a cell is larger than the first value, or the second response value indicates a predetermined value corresponding to the second response value.

2. The data processing apparatus according to claim 1, wherein the display unit displays that a service of the data processing apparatus has been terminated in a case where the determination unit has determined that the first response value indicates a second value indicating that the number of rewriting times of a cell is larger than the first value, or the second response value indicates a predetermined value corresponding to the second response value.

3. The data processing apparatus according to claim 1, further comprising
   a control unit configured to terminate a service of the data processing apparatus in a case where the determination unit has determined that the first response value indicates a second value indicating that the number of rewriting times of a cell is larger than the first value, or the second response value indicates a predetermined value corresponding to the second response value.

4. The data processing apparatus according to claim 1, wherein the erasing unit erases all of data stored in the non-volatile memory.

5. The data processing apparatus according to claim 1, wherein the erasing unit erases a part of data stored in the non-volatile memory.

6. The data processing apparatus according to claim 5, wherein the erasing unit determines the part of data to be erased according to a selection from a user or a predetermined setting.

7. The data processing apparatus according to claim 1, wherein the erasing unit performs the erasing after having stored, in another storage medium, a backup of data stored in the non-volatile memory.

8. A data processing apparatus for a data processing apparatus storing data in a non-volatile memory, comprising:
   a determination unit configured to determine whether a predicted value of life time of the non-volatile memory is shorter than a predetermined life time by referring to a response of a life time check command issued to a non-volatile memory, the response at least including one of a response value indicating a number of rewriting times of a cell in the non-volatile memory and a response value indicating a number of reserved blocks in the non-volatile memory;
   a display unit configured to display whether or not to erase data stored in the non-volatile memory, in a case where the determination unit determines that the predicted value of life time of the non-volatile memory is shorter than the predetermined life time;
   an accepting unit configured to accept a selection of whether or not to erase data stored in the non-volatile memory in a case where the determination unit determines that the predicted value of life time of the non-volatile memory is shorter than the predetermined life time; and
   an erasing unit configured to erase the data stored in the non-volatile memory, in a case where the accepting unit accepts the selection of erasing the data stored in the non-volatile memory, wherein
   after the accepting unit has accepted the selection of not erasing data stored in the non-volatile memory after the display unit has performed the display,
   the erasing unit erases the data stored in the non-volatile memory in accordance with a determination that a life time indicated by the response value indicating a number of rewriting times of a cell in the non-volatile memory or the response value indicating a number of reserved blocks in the non-volatile memory is shorter by a predetermined amount than the predetermined life time.

9. A data processing method that stores data in a non-volatile memory, comprising:
   determining whether a predicted value of life time of the non-volatile memory is shorter than a predetermined life time by referring to a response of a life time check command issued to a non-volatile memory, the response at least including one of a response value indicating a number of rewriting times of a cell in the non-volatile memory and a response value indicating a number of reserved blocks in the non-volatile memory;
   displaying whether or not to erase data stored in the non-volatile memory, in a case where it is determined that the predicted value of life time of the non-volatile memory is shorter than the predetermined life time;
   accepting a selection of whether or not to erase data stored in the non-volatile memory in a case where it is determined that the predicted value of life time of the non-volatile memory is shorter than the predetermined life time; and
   erasing the data stored in the non-volatile memory, in a case where it is accepted the selection of erasing the data stored in the non-volatile memory, wherein
   after the selection of not erasing data stored in the non-volatile memory has been accepted after the displaying,
   erasing the data stored in the non-volatile memory in accordance with a determination that a life time indicated by the response value indicating a number of rewriting times of a cell in the non-volatile memory or the response value indicating a number of reserved blocks in the non-volatile memory is shorter by a predetermined amount than the predetermined life time.

* * * * *